(12) United States Patent  
Zhou et al.

(10) Patent No.: US 11,984,624 B1
(45) Date of Patent: May 14, 2024

(54) LOWER PLASTIC ASSEMBLY, ENERGY STORAGE APPARATUS, AND ELECTRIC DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Guangdong (CN); Yongfeng Xiong, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/523,735

(22) Filed: Nov. 29, 2023

(30) Foreign Application Priority Data

Feb. 9, 2023 (CN) .......................... 202310091041.5

(51) Int. Cl.
*H01M 50/627* (2021.01)
*H01M 50/15* (2021.01)
*H01M 50/16* (2021.01)
*H01M 50/342* (2021.01)

(52) U.S. Cl.
CPC ......... *H01M 50/627* (2021.01); *H01M 50/15* (2021.01); *H01M 50/16* (2021.01); *H01M 50/3425* (2021.01); *H01M 2200/20* (2013.01)

(58) Field of Classification Search
CPC .......... H01M 50/627; H01M 50/3425; H01M 50/16; H01M 50/15; H01M 2200/20
See application file for complete search history.

(56) References Cited

FOREIGN PATENT DOCUMENTS

| CN | 207038571 U | 2/2018 |
| CN | 207938708 U | 10/2018 |
| CN | 208271958 U | 12/2018 |
| CN | 109980173 A | 7/2019 |

(Continued)

OTHER PUBLICATIONS

WIPO, International Search Report and Written Opinion for International Application No. PCT/CN2023/075268, Aug. 23, 2023, 12 pages.

(Continued)

*Primary Examiner* — Lingwen R Zeng
(74) *Attorney, Agent, or Firm* — IP Spring

(57) ABSTRACT

A lower plastic assembly, an energy storage apparatus, and an electric device are provided in the disclosure. The lower plastic assembly includes a first lower plastic member. The first lower plastic member includes a first-lower-plastic-member body. The first-lower-plastic-member body further has a first upper surface and a first lower surface. The first upper surface is opposite to the first lower surface. The first-lower-plastic-member body defines a first liquid-injection through-hole. The first liquid-injection through-hole extends through the first-lower-plastic-member body and is located at one end of the first-lower-plastic-member body. A cutout is defined at one side of the first liquid-injection through-hole and is in direct communication with the first liquid-injection through-hole, and the cutout extends through the first upper surface and the first lower surface.

20 Claims, 11 Drawing Sheets

(56) References Cited

FOREIGN PATENT DOCUMENTS

| | | |
|---|---|---|
| CN | 209071498 U | 7/2019 |
| CN | 209641695 U | 11/2019 |
| CN | 111769249 A | 10/2020 |
| CN | 216436008 U | 5/2022 |
| CN | 216648454 U | 5/2022 |
| CN | 216958263 U | 7/2022 |
| CN | 115632208 A | 1/2023 |
| WO | 2022007481 A1 | 1/2022 |

OTHER PUBLICATIONS

CNIPA, First Office Action for corresponding Chinese Patent Application No. 202310091041.5, Apr. 4, 2023, 15 pages.
CNIPA, Notification to Grant Patent Right for Invention for corresponding Chinese Patent Application No. 202310091041.5, Apr. 19, 2023, 8 pages.

LOWER PLASTIC ASSEMBLY, ENERGY STORAGE APPARATUS, AND ELECTRIC DEVICE

CROSS-REFERENCE TO RELATED APPLICATION(S)

This application claims priority under 35 U.S.C. § 119(a) to Chinese Patent Application No. 202310091041.5, filed Feb. 9, 2023, the entire disclosure of which is incorporated herein by reference.

TECHNICAL FIELD

This disclosure relates to the field of energy storage technology, and in particular, to a lower plastic assembly, an energy storage apparatus, and an electric device.

BACKGROUND

An existing secondary battery typically includes a housing, an end cover assembly, an electrode assembly, etc. The end cover assembly includes multiple components such as an upper cover and a lower plastic member, and the upper cover defines a liquid injection hole. After the upper cover is welded to the housing, an electrolyte is injected into the electrode assembly through the liquid injection hole. As a capacity of the secondary battery increases, the electrolyte required also increases, and liquid injection time can be reduced by increasing a liquid injection speed. An existing liquid injection hole is relatively small. When the liquid injection speed is increased, gas in the housing cannot be discharged in time, and this may even lead to a misoperation of an explosion-proof valve, resulting in a failure of the explosion-proof valve.

SUMMARY

In a first aspect, the lower plastic assembly is provided in the disclosure. The lower plastic assembly is configured to be assembled with an upper cover and includes a first lower plastic member. The first lower plastic member includes a first-lower-plastic-member body. The first-lower-plastic-member body further has a first upper surface and a first lower surface. The first upper surface is opposite to the first lower surface. The first-lower-plastic-member body defines a first liquid-injection through-hole. The first liquid-injection through-hole extends through the first-lower-plastic-member body and is located at one end of the first-lower-plastic-member body. A cutout is defined at one side of the first liquid-injection through-hole and is in direct communication with the first liquid-injection through-hole, and the cutout extends through the first upper surface and the first lower surface.

In a second aspect, the energy storage apparatus is provided in the disclosure. The energy storage apparatus includes an electrode assembly and the lower plastic assembly mentioned above. The lower plastic assembly is mounted at one end of the electrode assembly where a tab is disposed. The lower plastic assembly faces the electrode assembly.

In a third aspect, the electric device is provided in the disclosure. The electric device includes the energy storage apparatus mentioned above. The energy storage apparatus (1000) is configured for supplying power.

BRIEF DESCRIPTION OF THE DRAWINGS

In order to describe technical solutions in the disclosure more clearly, accompanying drawings required for describing implementations are briefly introduced below. Apparently, the accompanying drawings in the following illustration are merely some implementations of the disclosure. Those of ordinary skill in the art may also obtain other drawings based on these accompanying drawings without creative efforts.

Reference signs: 1000-energy storage apparatus, 100-end cover assembly, 200-electrode assembly, 30-lower plastic assembly, 40-upper cover, 41-upper cover body, 411-front face, 412-back face, 413-through groove, 414-first protrusion, 4141-first upper wall, 415-second protrusion, 4151-second upper wall, 417-first mounting recess, 418-second mounting recess, 42-positive-post through-hole, 43-negative-post through hole, 44-explosion-proof valve, 45-first flipping sheet, 46-second flipping sheet, 47-liquid injection hole, 10-first lower plastic member, 11-first-lower-plastic-member body, 111-first upper surface, 112-first lower surface, 113-first through groove, 1131-first side wall, 1132-second side wall, 117-first receiving recess, 118-recess, 1181-lower wall, 1182-peripheral wall, 1183-wall surface, 119-cutout, 1191-first part, 1192-second part, 12-first snapped protrusion, 13-first grid, 131-connecting portion, 1311-guiding slope, 132-first rib, 14-first liquid-injection through-hole, 15-first gas hole, 16-first protective grid, 17-first terminal-post through-hole, 18-first recess, 20-second lower plastic member, 21-second-lower-plastic-member body, 211-second upper surface, 212-second lower surface, 213-second through groove, 2131-third side wall, 2132-fourth side wall, 214-third through groove, 215-gas-hole, 217-second receiving recess, 22-second snapped protrusion, 23-second grid, 232-second rib, 24-third grid, 242-first divider, 243-second divider, 25-second gas hole, 26-second protective grid, 27-second terminal-post through-hole, 28-second recess, 29-protrusion, A-arched grid.

DETAILED DESCRIPTION

Technical solutions in implementations of the disclosure are clearly and completely described in the following with reference to accompanying drawings in the implementations of the disclosure. The described implementations are merely part rather than all of implementations of the disclosure. All other implementations obtained by those of ordinary skill in the art based on the implementations of the disclosure without creative efforts are within the protection scope of the disclosure.

Figure 1:
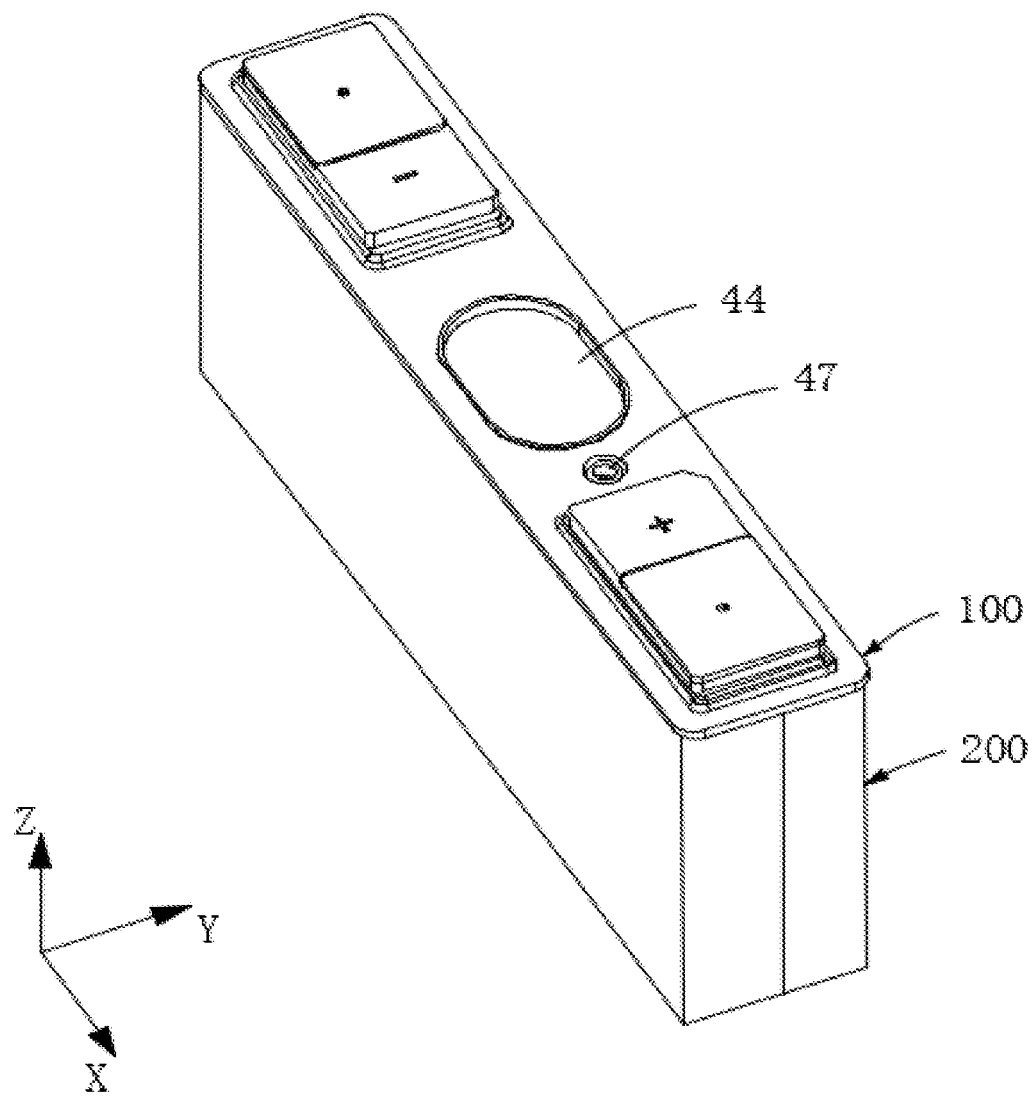
FIG. 1 is a schematic structural view of an energy storage apparatus provided in implementations of the disclosure.
Figure 2:
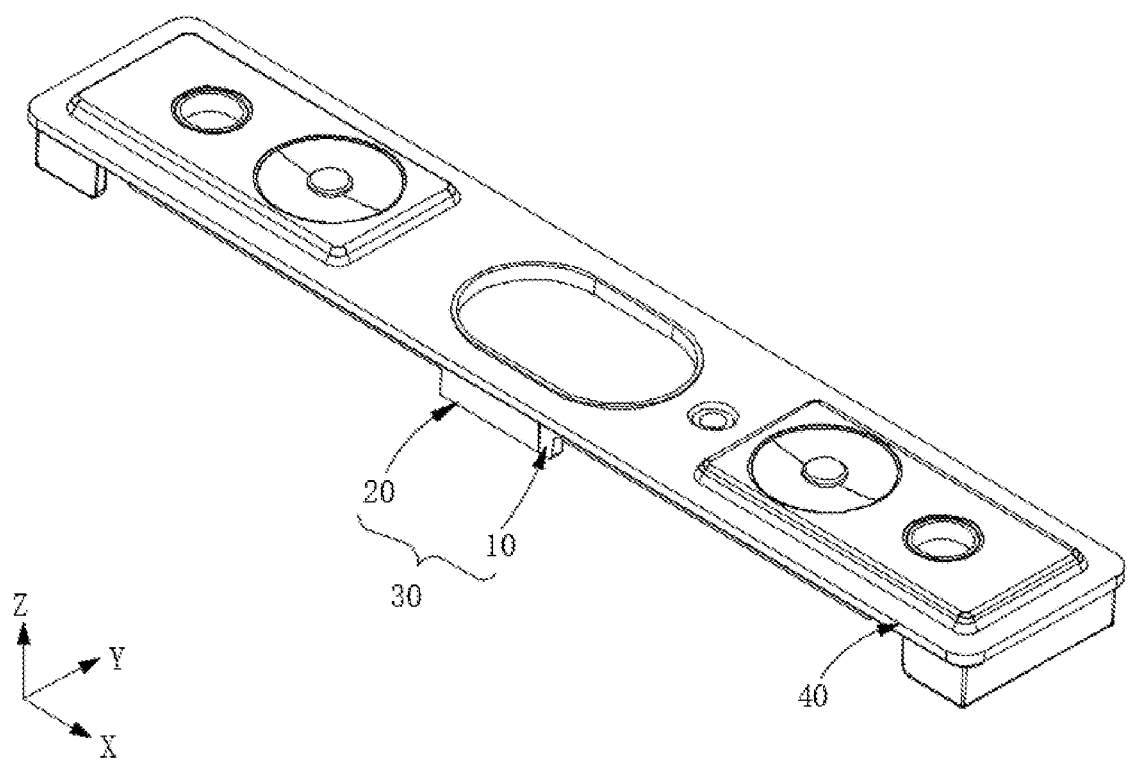
FIG. 2 is a schematic structural view of an end cover assembly of the energy storage apparatus in FIG. 1.

Referring to FIG. 1 and FIG. 2, FIG. 1 is a schematic structural view of an energy storage apparatus provided in implementations of the disclosure, and FIG. 2 is a schematic structural view of an end cover assembly of the energy storage apparatus in FIG. 1.

For the convenience of illustration, a length direction of an end cover assembly illustrated in FIG. 1 is defined as an X-axis direction, a width direction of the end cover assembly is defined as a Y-axis direction, a height direction of the end cover assembly is defined as a Z-axis direction, and the X-axis direction, the Y-axis direction, and the Z-axis direction are perpendicular to each other. Terms such as "upper" and "lower" for describing implementations of the disclosure are described based on orientations as illustrated in FIG. 1 of the specification. "Upper" refers to a direction towards a positive direction of the Z-axis, and "lower" refers to a direction towards a negative direction of the Z-axis, which do not form a limitation to the energy storage apparatus in practical application scenarios.

An end cover assembly 100 is provided in the disclosure. The end cover assembly 100 includes a lower plastic assembly 30. An energy storage apparatus 1000 including the end cover assembly 100 and an electric device (not illustrated) using the energy storage apparatus 1000 are further provided in the disclosure. In an implementation, as an example, the energy storage apparatus 1000 is a battery. The energy storage apparatus 1000 includes a housing (not illustrated), the end cover assembly 100, and an electrode assembly 200. The end cover assembly 100 is mounted at one end of the electrode assembly 200 where a tab (not illustrated) is disposed. The housing encloses a periphery and a bottom of the electrode assembly 200 and is in sealed connection with the end cover assembly 100. The electric device may be an unmanned aerial vehicle or an electric vehicle, etc. It can be understood that a practical application scenario of the energy storage apparatus 1000 provided in the implementations of the disclosure may be, but is not limited to, the listed products, and may also be other application scenarios, which is not strictly limited in the implementations of the disclosure.

Figure 3:
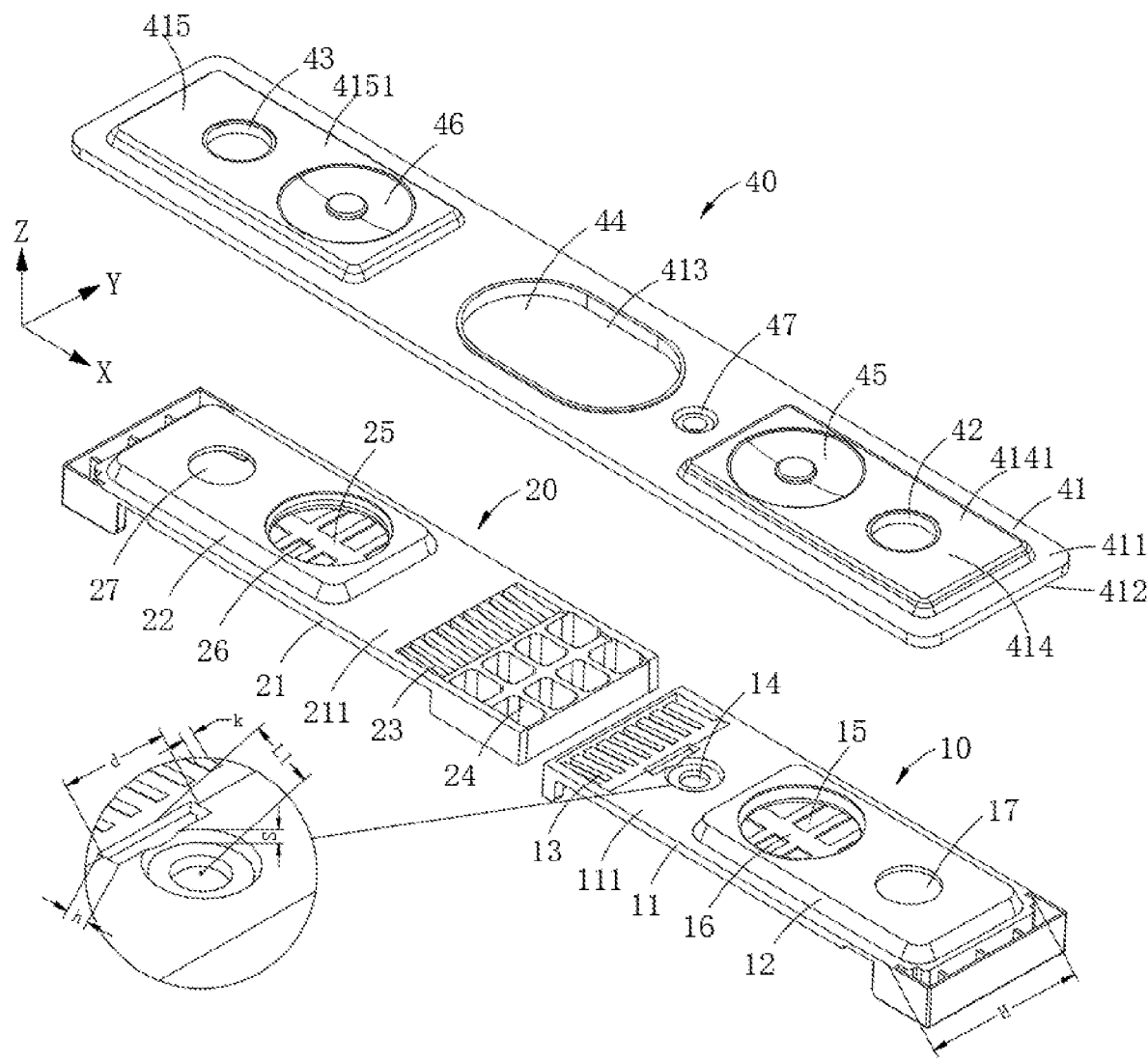
FIG. 3 is an exploded structural view of the end cover assembly in FIG. 2.
Figure 4:
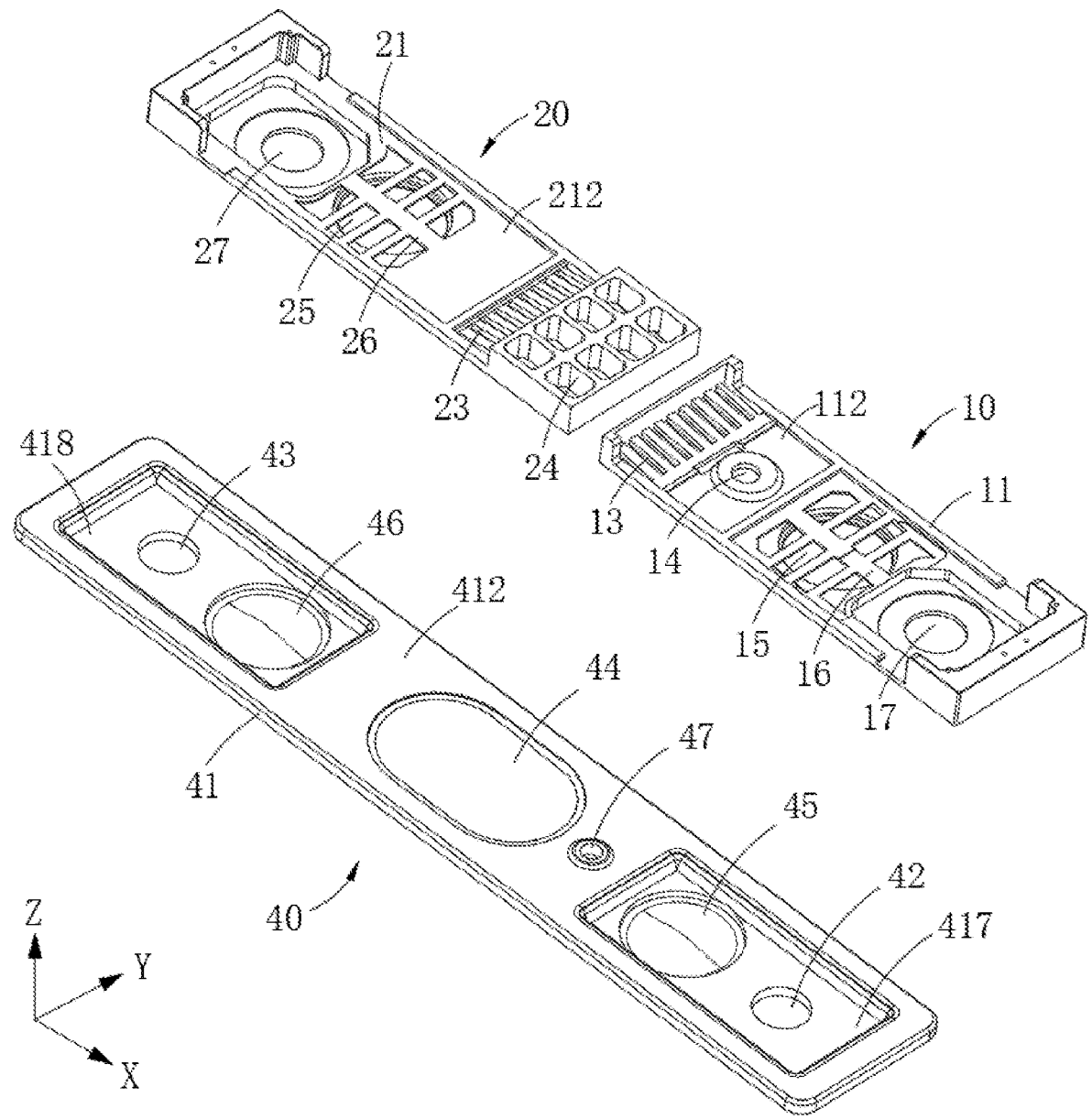
FIG. 4 is an exploded structural view of the end cover assembly in FIG. 2 from another view.

Referring to FIG. 1, FIG. 3, and FIG. 4, the end cover assembly 100 includes the lower plastic assembly 30 and an upper cover 40 stacked with the lower plastic assembly 30. The lower plastic assembly 30 is located between the electrode assembly 200 and the upper cover 40. In the implementations, the upper cover 40 may be a polished aluminum piece, and the lower plastic assembly 30 may be made of plastic and insulated.

In the implementations, the lower plastic assembly 30 includes a first lower plastic member 10 and a second lower plastic member 20. The first lower plastic member 10 and the second lower plastic member 20 are arranged side by side at one side of the upper cover 40 in a length direction (i.e., X-axis direction) of the end cover assembly 100. The first lower plastic member 10 and the second lower plastic member 20 are stacked with the upper cover 40. A sum of a length of the first lower plastic member 10 and a length of the second lower plastic member 20 is equal to a length of the upper cover 40. Each of a width of the first lower plastic member 10 and a width of the second lower plastic member 20 is substantially equal to a width of the upper cover 40, and a certain tolerance range is allowed.

In the implementations, the upper cover 40 includes an upper cover body 41, an explosion-proof valve 44, a first flipping sheet 45, and a second flipping sheet 46. The upper cover body 41 further defines a positive-post through-hole 42, a negative-post through hole 43, and a liquid injection hole 47. The positive-post through-hole 42, the first flipping sheet 45, the liquid injection hole 47, the explosion-proof valve 44, the second flipping sheet 46, and the negative-post through hole 43 are sequentially arranged at intervals in the X-axis direction (that is, a length direction of the upper cover body 41).

Specifically, the upper cover body 41 is an elongated thin plate, includes a front face 411 and a back face 412 opposite to the front face 411, and defines a first mounting recess 417 and a second mounting recess 418. The first mounting recess 417 and the second mounting recess 418 are located at opposite ends (arranged along the X-axis direction) of the back face 412 of the upper cover body 41. The first mounting recess 417 and the second mounting recess 418 are rectangular. The first mounting recess 417 is recessed from the back face 412 towards the front face 411 and forms a first protrusion 414 at the front face 411. The second mounting recess 418 is recessed from the back face 412 towards the front face 411 and forms a second protrusion 415 at the front face 411.

The first protrusion 414 has a first upper wall 4141. The first upper wall 4141 exceeds the front face 411 and is parallel to the front face 411, and a certain tolerance range is allowed. A back face of the first upper wall 4141 serves as a lower wall of the first mounting recess 417. The positive-post through-hole 42 extends through the first upper wall 4141. A through hole (not illustrated) is defined at one side of the first upper wall 4141 where the positive-post through-hole 42 is located. The first flipping sheet 45 is circular, and is accommodated in the through hole and welded with a hole wall of the through hole.

The second protrusion 415 has a second upper wall 4151. The second upper wall 4151 exceeds the front face 411 and is parallel to the front face 411, and a certain tolerance range is allowed. A back face of the second upper wall 4151 serves as a lower wall of the second mounting recess 418. The negative-post through hole 43 extends through the second upper wall 4151. A through-hole (not illustrated) is defined at one side of the second upper wall 4151 where the negative-post through hole 43 is located. The second flipping sheet 46 is a circular thin sheet, and is accommodated in the through-hole and soldered with a hole wall of the through-hole.

A through groove 413 is further defined at a middle portion of the upper cover body 41 and extends through the back face 412 and the front face 411, and the through groove 413 is located between the first mounting recess 417 and the second mounting recess 418. The explosion-proof valve 44 is accommodated in the through groove 413 and is welded with a wall of the through groove 413. When an internal pressure of the energy storage apparatus 1000 is excessively high, the explosion-proof valve 44 will automatically open to relieve the pressure, thereby avoiding an explosion.

It can be understood that, the positive-post through-hole 42 is located at one end of the upper cover body 41 and the negative-post through hole 43 is located at the other end of the upper cover body 41, and a positive post may extend through the positive-post through-hole 42 and a negative post of the battery may extend through the negative-post through hole 43. The first flipping sheet 45 is disposed at one side of the positive-post through-hole 42 close to the explosion-proof valve 44, and the second flipping sheet 46 is disposed at one side of the negative-post through hole 43 close to the explosion-proof valve 44. When the internal pressure of the energy storage apparatus 1000 is relatively high, the first flipping sheet 45 or the second flipping sheet 46 will bend and deform upwards to abut against a lower surface of a metal block, so that the battery is short-circuited to provide a protective effect.

The liquid injection hole 47 is located between the first flipping sheet 45 and the explosion-proof valve 44. During liquid injection for a power battery, an electrolyte is injected into the battery through the liquid injection hole 47 on the upper cover 40.

Figure 5:
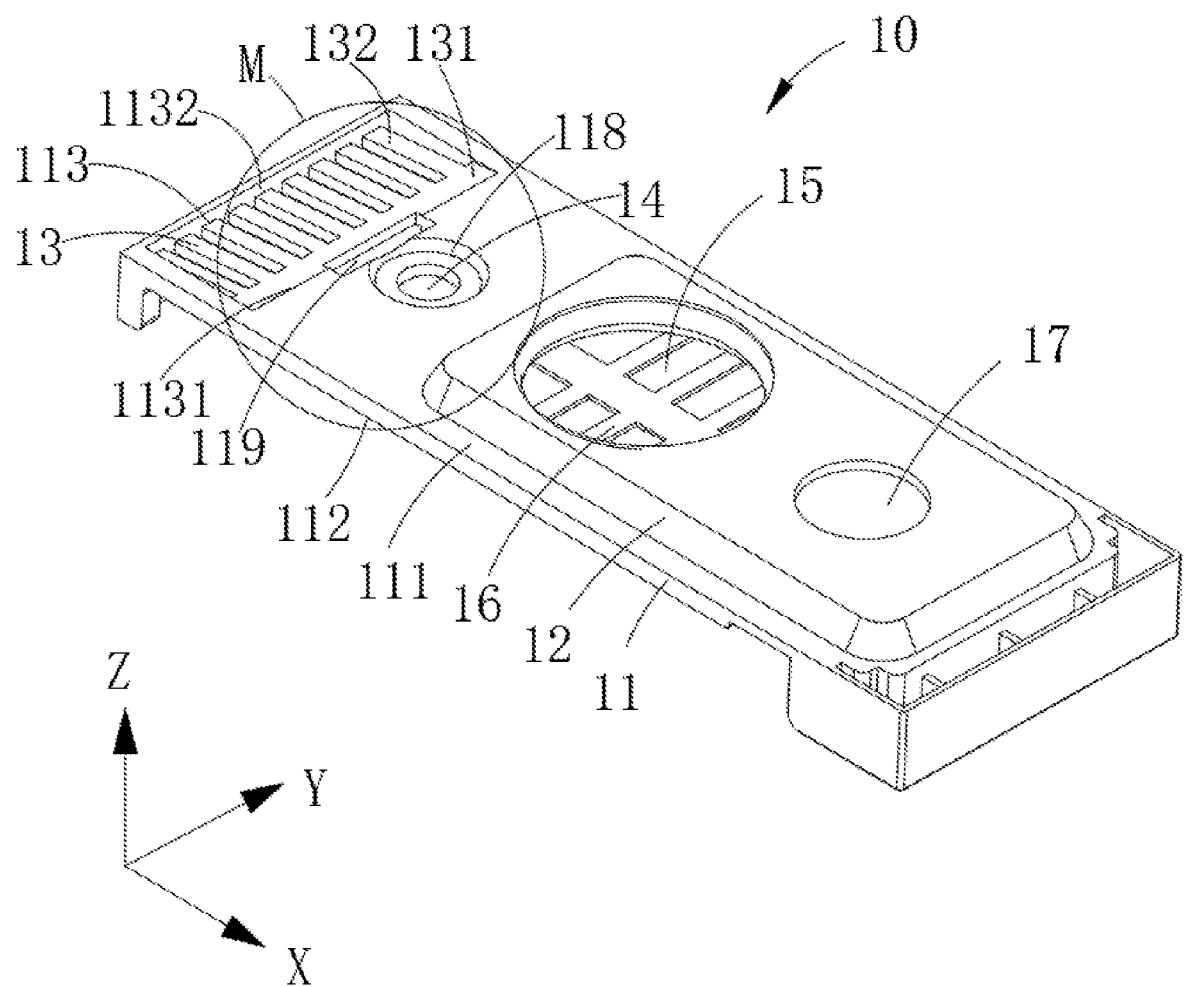
FIG. 5 is a schematic structural view of a first lower plastic member of a lower plastic assembly in FIG. 3.
Figure 6:
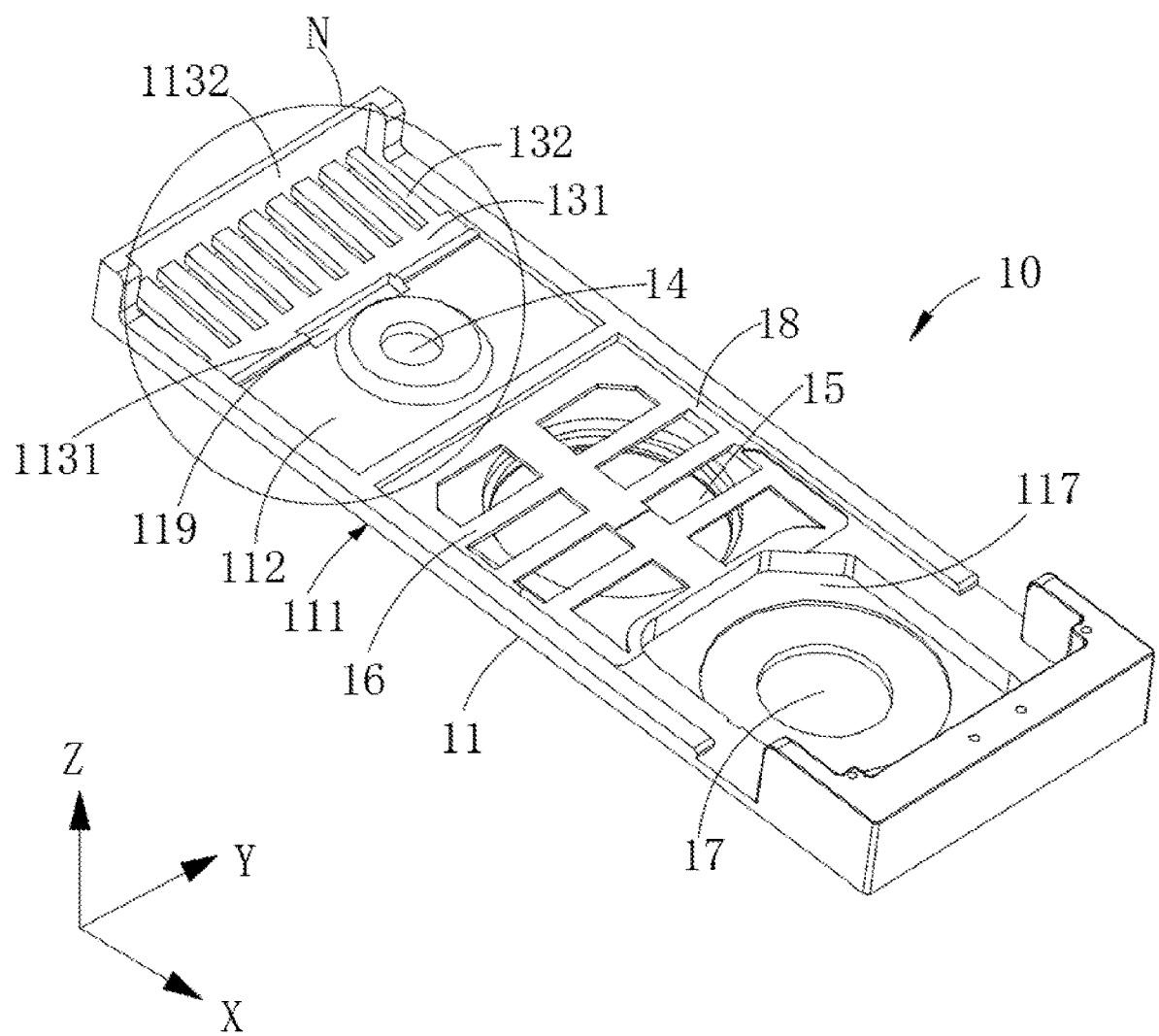
FIG. 6 is a schematic structural view of the first lower plastic member of the lower plastic assembly in FIG. 5 from another view.

Referring to FIG. 5 and FIG. 6 together, in the implementations, the first lower plastic member 10 includes a first-lower-plastic-member body 11 and a first snapped protrusion 12. In a thickness direction (i.e., Z-axis direction) of the first lower plastic member 10, the first-lower-plastic-member body 11 is a substantially rectangular thin plate. The first-lower-plastic-member body 11 has a first upper surface 111 and a first lower surface 112 opposite to the first upper surface 111. Specifically, the first snapped protrusion 12 protrudes from the first upper surface 111 of the first-lower-plastic-member body 11 and is located at one end of the first-lower-plastic-member body 11 in a length direction (i.e., X-axis direction) of the first lower plastic member 10. The first-lower-plastic-member body 11 further defines a first through groove 113 at one end away from the first snapped protrusion 12. The first through groove 113 is rectangular and extends through the first upper surface 111 and the first lower surface 112. The first through groove 113 has a first side wall 1131 and a second side wall 1132 that are opposite to each other in the length direction (i.e., X-axis direction) of the first lower plastic member 10. The first through groove 13 is configured to direct pressure-gas generated in the energy storage apparatus 1000 to the explosion-proof valve 44.

In the implementations, the first lower plastic member 10 further includes a first grid 13 and a first protective grid 16. The first-lower-plastic-member body 11 defines a first liquid-injection through-hole 14, a first terminal-post through-hole 17, and a first recess 18. The first grid 13, the first liquid-injection through-hole 14, the first recess 18, and the first terminal-post through-hole 17 are sequentially arranged on the first-lower-plastic-member body 11 in the length direction (i.e., X-axis direction) of the first lower plastic member 10. The first liquid-injection through-hole 14 extends through the first-lower-plastic-member body 11 and is located at one end of the first-lower-plastic-member body 11.

In the implementations, the first grid 13 is formed in the first through groove 113 and includes a connecting portion 131 and multiple first ribs 132, where the multiple first ribs 132 are arranged side by side and at intervals. The connecting portion 131 is elongated and extends in a width direction (i.e., Y-axis direction) of the first lower plastic member 10. One side of the connecting portion 131 is fixed to the first side wall 1131 of the first through groove 113, and the other side of the connecting portion 131 extends towards the second side wall 1132 at one end of the first-lower-plastic-member body 11. The connecting portion 131 includes a guiding slope 1311. One end of each of the multiple first ribs 132 is connected to a face of the connecting portion 131 away from the first side wall 1131, the other end of each of the multiple first ribs 132 is fixed to the second side wall 1132 of the first through groove 113, and the multiple first ribs 132 extend towards the second side wall 1132 located at the end of the first-lower-plastic-member body 11. The guiding slope 1311 of the connecting portion 131 and the multiple first ribs 132 are inclined towards the first lower surface 112, and specifically, each of the guiding slope 1311 and the multiple first ribs 132 is inclined towards the first lower surface 112 from a side away from the second side wall 1132. An included angle between the first upper surface 111 and each of the first ribs 132 is an obtuse angle. Each two adjacent first ribs 132 define a first gap therebetween and the first gap is elongated, and gas can flow through the first gap.

In some implementations, a width k of the first gap in the length direction of the first lower plastic member 10 is 0.4 mm to 2 mm, and the width k of the first gap is a distance between each two adjacent first ribs 132. In the width direction of the first lower plastic member 10, a first gap is also defined between the outermost first rib 132 among the multiple first ribs 132 and a wall of the first through groove 113, that is, the first gap is also defined between the outermost first rib 132 and the first-lower-plastic-member body 11.

The first terminal-post through-hole 17 is circular and extends through the first upper surface 111 and the first lower surface 112. The first terminal-post through-hole 17 is defined on the first snapped protrusion 12 and is close to one end of the first-lower-plastic-member body 11. The positive post can pass through the first terminal-post through-hole 17.

The first recess 18 is substantially rectangular, and is recessed from the first lower surface 112 towards the first upper surface 111 in a thickness direction of the first-lower-plastic-member body 11. The first recess 18 corresponds to the first snapped protrusion 12, and is located between the first liquid-injection through-hole 14 and the first terminal-post through-hole 17.

The first gas hole 15 is defined on a lower wall of the first recess 18, and extends through a surface of the lower wall of the first recess 18 and the first upper surface 111. The first gas hole 15 is configured to direct the pressure-gas generated in the energy storage apparatus 1000 to the first flipping sheet 45.

The first protective grid 16 is a grid-shaped thin plate and located at one side of the first lower surface 112 of the first-lower-plastic-member body 11. Specifically, the first protective grid 16 is formed in the first recess 18. The first protective grid 16 may be plastic, and may be integrally formed with the first lower plastic member 10. In the thickness direction (i.e., Z-axis direction) of the first-lower-plastic-member body 11, the first protective grid 16 covers the first gas hole 15. In the thickness direction (i.e., Z-axis direction) of the first-lower-plastic-member body 11, an orthographic projection of the first protective grid 16 is larger than an orthographic projection of the first gas hole 15. The first protective grid 16 has an exhaust region (not illustrated), and the exhaust region is composed of multiple gaps and is in communication with the first gas hole 15.

Figure 7:
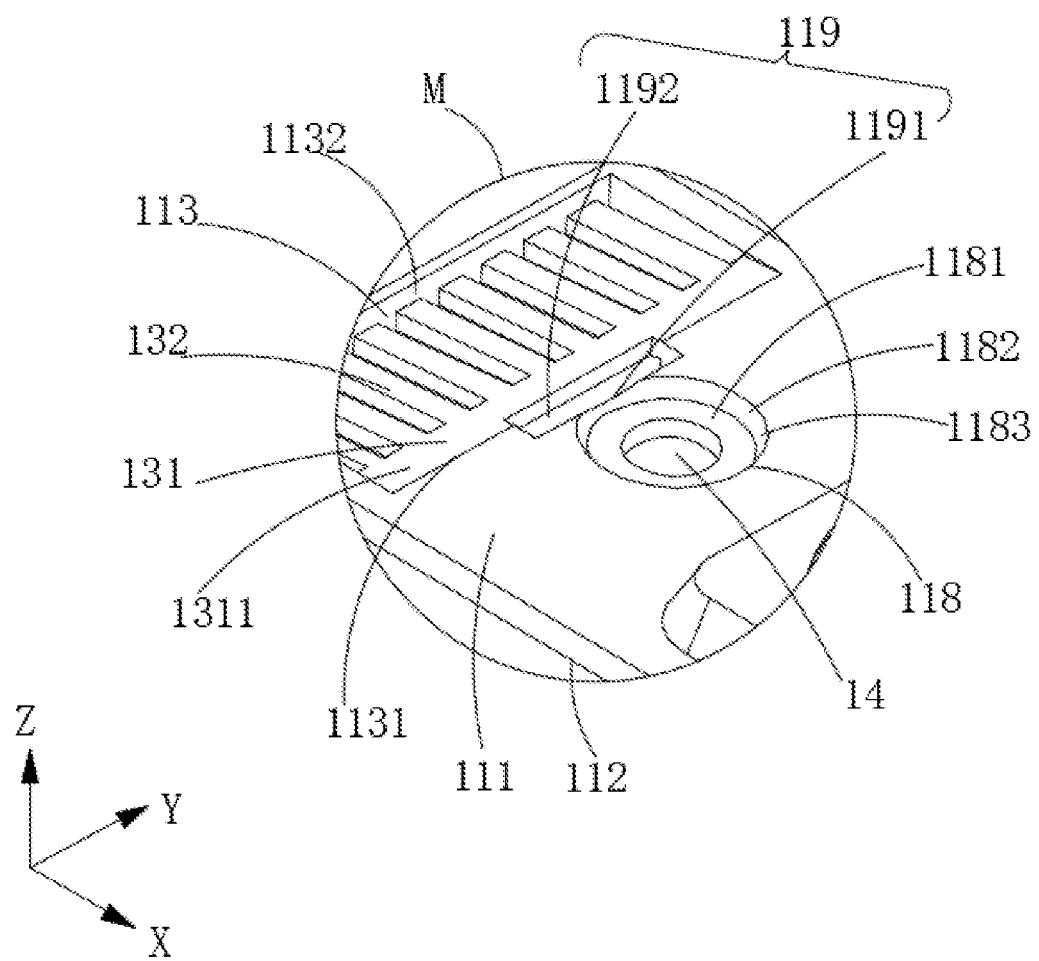
FIG. 7 is a schematic structural view of the first lower plastic member at circle M in FIG. 5.
Figure 8:
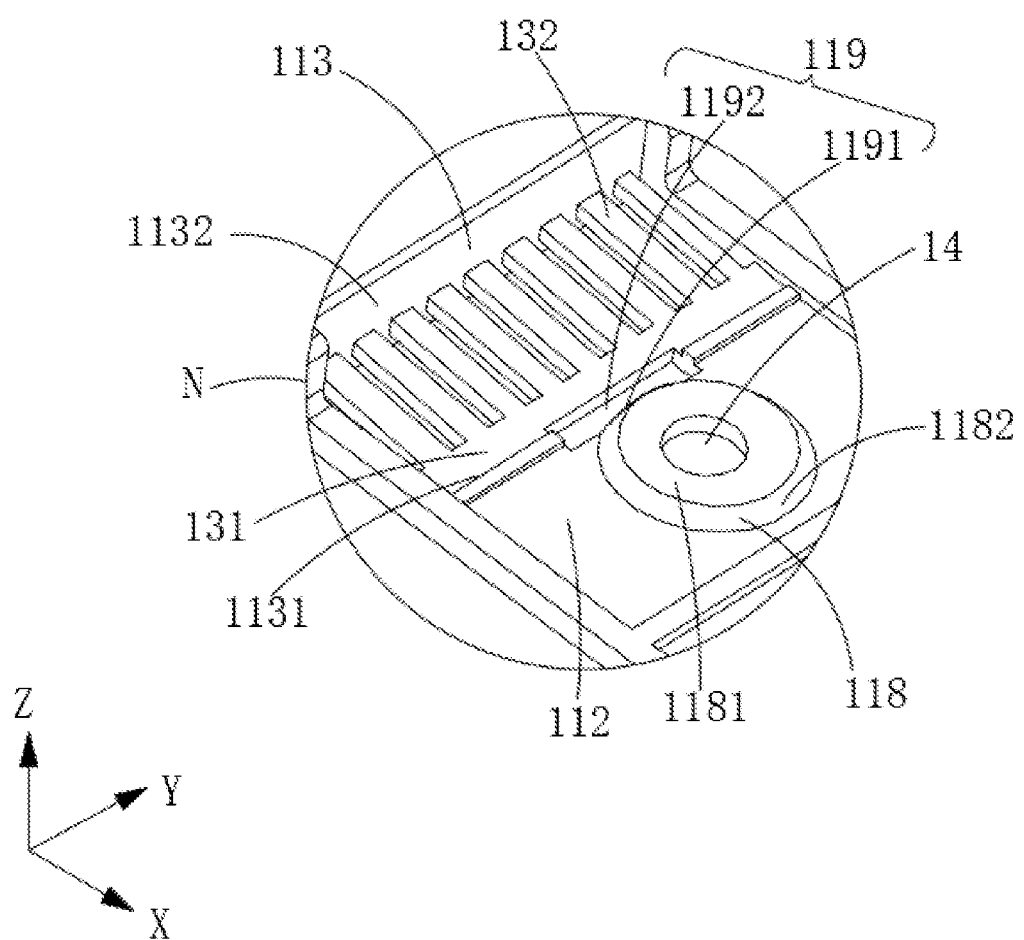
FIG. 8 is a schematic structural view of the first lower plastic member at circle N in FIG. 6.

The first-lower-plastic-member body 11 further defines a first receiving recess 117 that is recessed from the first lower surface 112 and located at one end away from the first liquid-injection through-hole 14. The first terminal-post through-hole 17 extends through a lower wall of the first receiving recess 117 in the thickness direction (i.e., Z-axis direction) of the first-lower-plastic-member body 11. The first receiving recess 117 is adjacent to the first protective grid 16. Referring to FIG. 7 and FIG. 8, the first liquid-injection through-hole 14 is close to the first grid 13 and is configured to cooperate with the liquid injection hole 47 to enable the electrolyte to flow into the electrode assembly 200. A diameter of the first liquid-injection through-hole 14 is greater than a diameter of the liquid injection hole 47. In the implementations, the first-lower-plastic-member body 11 further defines a recess 118. The recess 118 is recessed from the first upper surface 111 and is adjacent to the first through groove 113. Specifically, the recess 118 is circular. The recess 118 has a lower wall 1181 and a peripheral wall 1182. The peripheral wall 1182 surrounds a periphery of the lower wall 1181. A diameter of the lower wall 1181 is greater than the diameter of the first liquid-injection through-hole 14. A wall surface 1183 of the peripheral wall 1182 is a slope, and a diameter of the peripheral wall 1182 at one side on the first upper surface 111 is greater than a diameter of the peripheral wall 1182 at the other side connected to the lower wall 1181. It can be understood that the peripheral wall 1182 gradually reduces in diameter in a direction from the first upper surface 111 to the lower wall 1181. The wall surface 1183 of the peripheral wall 1182 is inclined from the first upper surface 111 towards the lower wall 1181. An included angle between the wall surface 1183 of the peripheral wall 1182 and the first upper surface 111 is an obtuse angle. The included angle between the wall surface 1183 of the peripheral wall 1182 and the first upper surface 111 ranges from 95° to 160°. In an implementation, the included angle is 120°. In another implementation, the wall surface 1183 of the peripheral wall 1182 may also be planar, i.e., perpendicular or substantially perpendicular to the first upper surface 111.

In the thickness direction of the first-lower-plastic-member body 11, a depth s of the recess 118 ranges from 0.8 mm to 6 mm. In an implementation, the depth s of the recess 118 is 1.2 mm. The depth s of the recess 118 is greater than 0.8 mm, and thus the recess 118 can sufficiently accommodate the liquid injection hole 47 protruding downwards from the upper cover 40. The depth s of the recess 118 is smaller than 6 mm, and thus a lower surface of the lower wall 1181 can be prevented from protruding beyond a thickest part of the first lower plastic member rubber 10, thereby avoiding the lower wall 1181 from interfering with the electrode assembly 200 below the lower wall 1181, and a reduction in an energy density of the energy storage apparatus 1000. In the thickness direction (i.e., Z-axis direction) of the first-lower-plastic-member body 11, the first liquid-injection through-hole 14 extends through the lower wall 1181 of the recess 118 and the first lower surface 112. In the implementations, the recess 118 is recessed from the first upper surface 111 towards the first lower surface 112, and forms a protrusion on the first lower surface 112, that is, the peripheral wall 1182 and the lower wall 1181 exceeds the first lower surface 112.

The first liquid-injection through-hole 14 is defined on the lower wall 1181 of the recess 118, and the wall surface 1183 of the peripheral wall 1182 of the recess 118 is inclined, such that during liquid injection the electrolyte in the recess 118 can flow into the first liquid-injection through-hole 14 along the wall surface 1183, which can prevent the electrolyte from spattering onto the first upper surface 111 of the first-lower-plastic-member body 11, thereby avoiding waste of the electrolyte. It should be understood that, in other implementations, the recess 118 may also be of other shapes, such as square.

In the implementations, the peripheral wall 1182 of the recess 118 defines a cutout 119 that is rectangular and extends through the first upper surface 111 and the first lower surface 112 of the first-lower-plastic-member body 11. The rectangular cutout 119 can facilitate flow of the electrolyte and prevent a foreign object from blocking the first liquid-injection through-hole 14 when flowing through the cutout 119. The cutout 119 is defined between the first liquid-injection through-hole 14 and the first through groove 113, and is in communication the first through groove 113 and the recess 118. Specifically, the cutout 119 includes a first part 1191 and a second part 1192 that is located between the first part 1191 and the multiple first ribs 132. The first part 1191 extends through the wall surface of the peripheral wall 1182 in the length direction (i.e., X-axis direction) of the first lower plastic member 10 and is in communication with the second part 1192. The first part 1191 extends from the first upper surface 111 towards the first lower surface 112 and is in communication with the recess 118 recessed from the first upper surface 111, such that the electrolyte around the recess 118 is easy to enter the cutout 119. The second part 1192 is elongated and extends in the width direction (i.e., Y-axis direction) of the first lower plastic member 10. The second part 1192 extends through the first upper surface 111 and the first lower surface 112, and is located at one side of the first through groove 113 where the connecting portion 131 is disposed. The second part 1192 extends through part of the guiding slope 1311 of the connecting portion 131, which may be understood as that the second part 1192 is in communication with the first through groove 113. In the length direction of the first-lower-plastic-member body 11, a distance L1 between one side of the cutout 119 away from the recess 118 and a center of the recess 118 ranges from 2.8 mm to 8.4 mm. A width h of the cutout 119 ranges from 0.8 mm to 3.2 mm, and specifically, the width h may be 1.4 mm. A length d of the cutout 119 ranges from 4 mm to 10 mm, and specifically, the length d may be 6.5 mm. In an implementation, the distance L1 between the one side of the cutout 119 away from the recess 118 and the center of the recess 118 is 5.25 mm. The distance between the one side of the cutout 119 away from the recess 118 and the center of the recess 118 is greater than 2.8 mm, such that the cutout 119 will not intersect with the first liquid-injection through-hole 14, and can be in direct communication with the first liquid-injection through-hole 14, thereby avoiding a reduction in structural strength. The distance between the one side of the cutout 119 away from the recess 118 and the center of the recess 118 is less than 8.4 mm, such that the cutout 119 can intersect with the wall surface of the peripheral wall 1182 of the recess 118. A ratio of the length d of the cutout 119 to a width H of the first-lower-plastic-member body 11 ranges from 0.15 to 0.4, and specifically, the ratio may be 0.25. The ratio of the length d of the cutout 119 to the width H of the first-lower-plastic-member body 11 is greater than 0.15, such that the cutout 119 has a sufficient area for the electrolyte to flow quickly. The ratio of the length d of the cutout 119 to the width H of the first-lower-plastic-member body 11 is less than 0.4, avoiding an excessive large length of the cutout 119, and thus the first-lower-plastic-member body 11 can have sufficient strength and accordingly breakage of the first-lower-plastic-member body 11 can be avoided. A ratio of an area of the cutout 119 to an area of the first liquid-injection through-hole 14 ranges from 0.65 to 1.35, such that the cutout 119 has a sufficient area for the electrolyte to flow quickly.

With the cutout 119, when the electrolyte spatters onto the recess 118 and the first upper surface 111 around the first liquid-injection through-hole 14, the electrolyte in the recess 118 can directly flow downwards through the cutout 119 to the electrode assembly 200, and at the same time, the electrolyte flows along the guiding slope 1311 of the connecting portion 131 of the first grid 13 into the multiple first gaps between the multiple first ribs 132, and eventually flows through the multiple first gaps to the electrode assembly 200. Furthermore, the cutout 119 can serve as a second flow channel. When the first liquid-injection through-hole 14 is blocked by a foreign object, such as a broken tab or an insulation film, the electrolyte can flow directly downwards through the cutout 119 to the electrode assembly 200. That is, when the first liquid-injection through-hole 14 is blocked or is flow-limited by a foreign object, the electrolyte can also flow through the cutout 119 directly downwards to the electrode assembly 200. When both the first liquid-injection through-hole 14 and the cutout 119 are blocked, the electrolyte can also flow along the guiding slope 1311 of the connecting portion 131, and eventually flow through the multiple first gaps between the multiple first ribs 132 into the electrode assembly 200. Therefore, with the aid of the cutout 119, there will be no residual electrolyte around the first liquid-injection through-hole 14 and the recess 118 will not be completely filled with electrolyte, avoiding electrolyte overflow that may cause a waste of the electrolyte and a corrosion of an outer surface. Both the cutout 119 and the first liquid-injection through-hole 14 can enable the electrolyte to flow into the electrode assembly 200, and therefore, the cutout 119 can also serve to divert electrolyte flow to prevent excessive electrolyte flow at the first liquid-injection through-hole 14 and to accelerate an injection speed of the electrolyte.

It can be understood that, during backflow of the electrolyte due to an excessive electrolyte flow or a partial blockage at the first liquid-injection through-hole 14, the electrolyte may also flow downwards through the cutout 119 to the electrode assembly 200. The cutout 119 can also be used for discharging of gas in the electrode assembly 200, thereby avoiding an excessive gas pressure in the electrode assembly 200, and thus a misoperation of the explosion-proof valve, which may cause a failure of the battery, can be avoided. It can be understood that in other implementations, the cutout 119 can be of other shapes, such as square, circle, oval, prism, etc.

Figure 9:
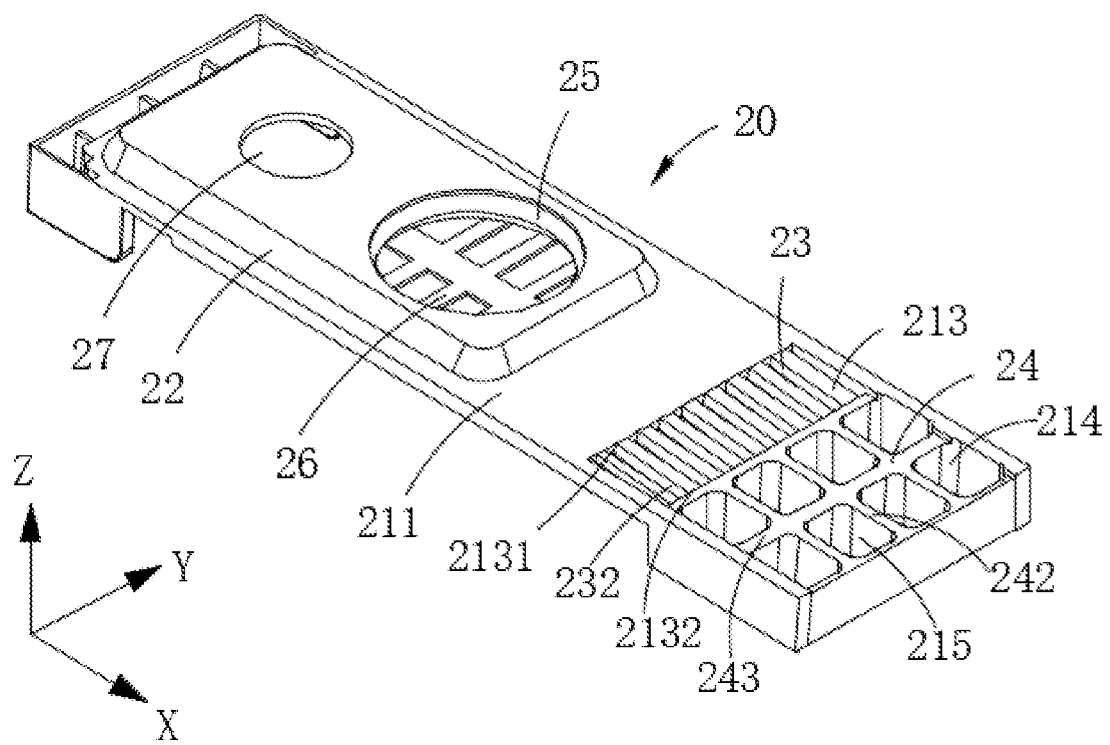
FIG. 9 is a structural schematic view of a second lower plastic member of the lower plastic assembly in FIG. 3.
Figure 10:
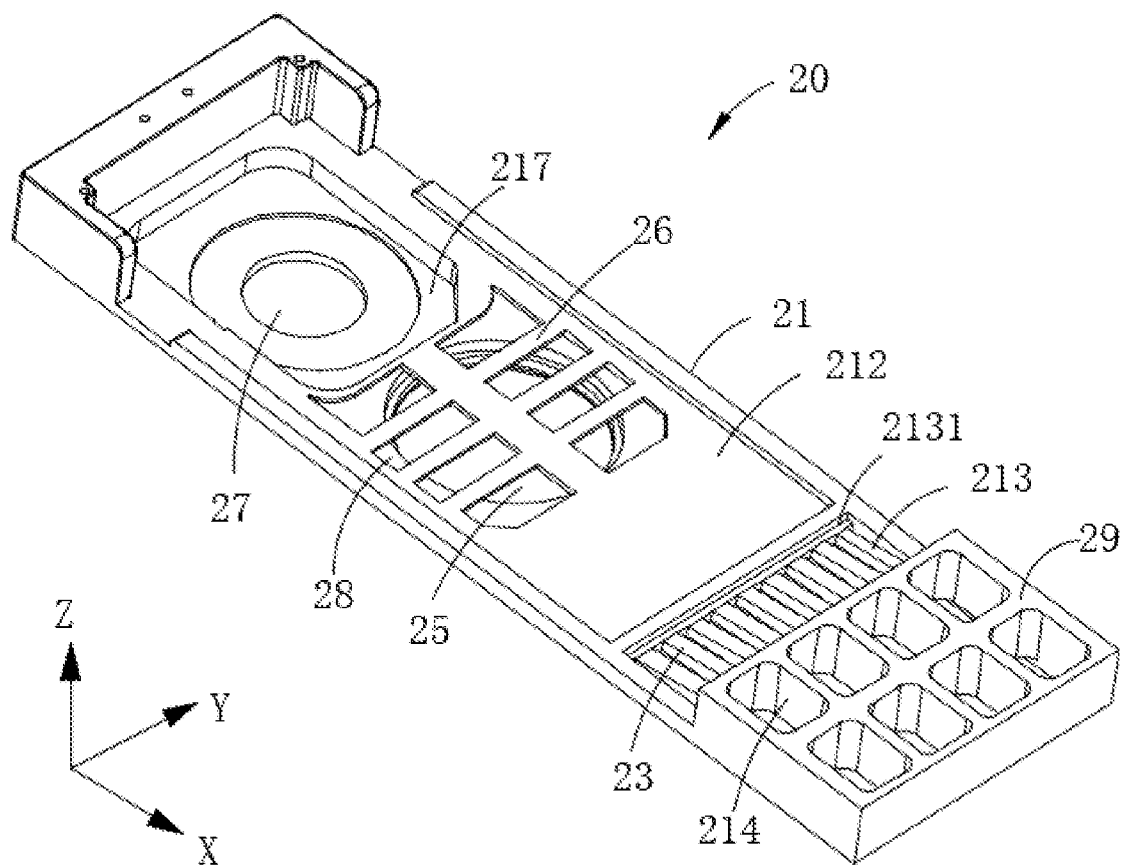
FIG. 10 is a schematic structural view of the second lower plastic member of the lower plastic assembly in FIG. 9 from another view.

Referring to FIG. 9 and FIG. 10 together, in the implementations, the second lower plastic member 20 includes a second-lower-plastic-member body 21 and a second snapped protrusion 22. In a thickness direction (i.e., Z-axis direction) of the second-lower-plastic-member body 21, the second-lower-plastic-member body 21 is a substantially rectangular thin plate and has a second upper surface 211 and a second lower surface 212 opposite to the second upper surface 211. Specifically, the second snapped protrusion 22 protrudes from the second upper surface 211 of the second-lower-plastic-member body 21 and is located at one end of the second-lower-plastic-member body 21 in the X-axis direction.

The second-lower-plastic-member body 21 further defines a second through groove 213 and a third through groove 214 at one end away from the second snapped protrusion 22, and the second through groove 213 and the third through groove 214 are located side by side at intervals along the X-axis direction. The second through groove 213 is rectangular and extends through the second upper surface 211 and the second lower surface 212. The second through groove 213 has a third side wall 2131 and a fourth side wall 2132, which are opposite to each other in the length direction (i.e., X-axis direction) of the second-lower-plastic-member body 21. The third through groove 214 is rectangular and extends through the second upper surface 211 and the second lower surface 212. The second through groove 213 and the third through groove 214 are both configured to guide pressure-gas generated in the energy storage apparatus 1000 to the explosion-proof valve 44.

In the implementations, the second lower plastic member 20 further includes a second grid 23, a third grid 24, and a second protective grid 26. The second-lower-plastic-member body 21 defines a second gas hole 25, a second terminal-post through-hole 27, and a second recess 28. The third grid 24, the second grid 23, the second recess 28, and the second terminal-post through-hole 27 are sequentially located on the second-lower-plastic-member body 21 in the length direction (i.e., X-axis direction) of the second lower plastic member 20.

The second grid 23 is formed in the second through groove 213 and includes multiple second ribs 232 arranged side by side at intervals. One end of each of the multiple second ribs 232 is fixed to the third side wall 2131 of the second through groove 213, and the multiple second ribs 232 extend towards the fourth side wall 2132 located at one end of the second-lower-plastic-member body 21. The other end of each of the multiple second ribs 232 is fixed to the fourth side wall 2132 of the second through groove 213, and is inclined towards the second lower surface 212. An included angle between each of the multiple second ribs 232 and the second upper surface 211 is an obtuse angle. Each two adjacent second ribs 232 defines a second gap (not illustrated) therebetween and the second gap is elongated, and gas can flow through the second gap. In the width direction (i.e., Y-axis direction) of the second lower plastic member 20, second gaps are also defined between two outermost second ribs 232 among the multiple second ribs 232 and two opposite walls of the second through groove 213, that is, the second gap is also defined between each of the outermost second ribs 232 and the second-lower-plastic-member body 21.

The third grid 24 is formed in the third through groove 214 and includes multiple first dividers 242 and a second divider 243. The multiple first dividers 242 are arranged side by side at intervals in the width direction (i.e., Y-axis direction) of the second lower plastic member 20. Each of the multiple first dividers 242 is connected to two opposite side walls of the third through groove 214 in the length direction (i.e., X-axis direction) of the second lower plastic member 20. The second divider 243 extends through the multiple first dividers 242 in the width direction (i.e., Y-axis direction) of the second lower plastic member 20, and connects two opposite side walls of the third through groove 214 in the width direction (i.e., Y-axis direction) of the second lower plastic member 20. It can be understood that the multiple first dividers 242 and the second divider 243 cooperate to define multiple gas-holes 215 in the third through groove 214. In the implementations, the number of the second dividers 243 is one, and in other implementations, the number of the second divider 243 may be two or more.

The second terminal-post through-hole 27 is circular and extends through the second upper surface 211 and the second lower surface 212. The second terminal-post through-hole 27 is located on the second snapped protrusion 22 and is close to one end of the second-lower-plastic-member body 21. The negative pole can pass through the second terminal-post through-hole 27.

The second recess 28 is substantially rectangular, and is recessed from the second lower surface 212 towards the second upper surface 211 in the thickness direction of the second-lower-plastic-member body 21. The second recess 28 corresponds to the second snapped protrusion 22 and is close to one end of the second grid 23.

The second gas hole 25 is defined on a lower wall of the second recess 28 and extends through a surface of the lower wall of the second recess 28 and the second upper surface 211. The second gas hole 25 is configured to direct the pressure-gas generated in the energy storage apparatus 1000 to the second flipping sheet 46.

The second protective grid 26 is a grid-shaped thin plate and located at one side of the second lower surface 212 of the second-lower-plastic-member body 21. Specifically, the second protective grid 26 is formed in the second recess 28. The second protective grid 26 may be plastic, and may be integrally formed with the second lower plastic member 20. In the thickness direction (i.e., Z-axis direction) of the second-lower-plastic-member body 21, the second protective grid 26 covers the second gas hole 25. In the thickness direction (i.e., Z-axis direction) of the second-lower-plastic-member body 21, an orthographic projection of the second protective grid 26 is larger than an orthographic projection of the second gas hole 25. The second protective grid 26 has an exhaust region (not illustrated), and the exhaust region is composed of multiple gaps and is in communication with the second gas hole 25.

The second-lower-plastic-member body 21 further defines a second receiving recess 217. The second receiving recess 217 is recessed from the second lower surface 212 and is located at one end of the second lower surface 212 away from the second through groove 213. The second terminal-post through-hole 27 extends through a lower wall of the second receiving recess 217 in the thickness direction (i.e., Z-axis direction) of the second-lower-plastic-member body 21. The second receiving recess 217 is adjacent to the second protective grid 26.

Figure 11:
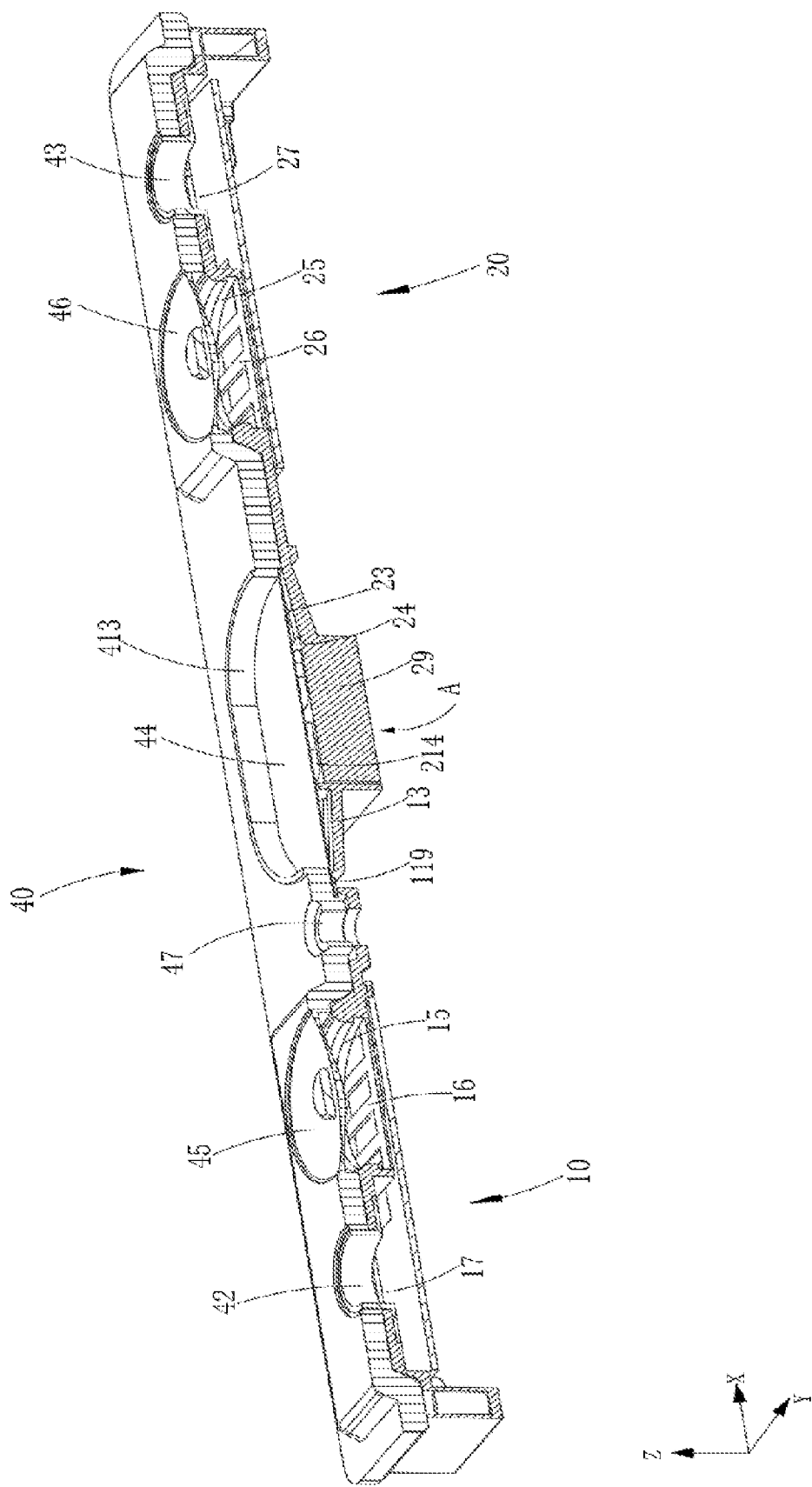
FIG. 11 is a schematic structural view illustrating the upper cover, the first lower plastic member, and second lower plastic member in FIG. 3 that are assembled together.

FIG. 11 is a schematic structural view illustrating the upper cover 40, the first lower plastic member 10, and second lower plastic member 20 that are assembled together. The first lower plastic member 10 is stacked on one side of the upper cover 40 where the liquid injection hole 47 is defined. The first upper surface 111 of the first lower plastic member 10 faces and is attached to the back face 412 of the upper cover 40. The first snapped protrusion 12 is inserted into the first mounting recess 417. The first snapped protrusion 12 can be snapped into the first mounting recess 417 to achieve mutual positioning. In a thickness direction (i.e., Z-axis direction) of the upper cover 40, the first terminal-post through-hole 17 of the first lower plastic member 10 faces and is in communication with the positive-post through-hole 42 of the upper cover 40. The first gas hole 15 of the first lower plastic member 10 faces the through hole of the upper cover 40 and the first flipping sheet 45. The first liquid-injection through-hole 14 of the first lower plastic member 10 faces and is in communication with the liquid injection hole 47 of the upper cover 40. The first grid 13 of the first lower plastic member 10 faces part of the explosion-proof valve 44 of the upper cover 40. Since the diameter of the first liquid-injection through-hole 14 of the first lower plastic member 10 is greater than the diameter of the liquid injection hole 47 of the upper cover 40, during injection of the electrolyte into the electrode assembly 200 through the liquid injection hole 47 and the first liquid-injection through-hole 14 coaxial with the liquid injection hole 47, the electrolyte can be prevented from spattering onto the first upper surface 111 of the first lower plastic member 10, and a stay time of the electrolyte around the first liquid-injection through-hole 14 of the first lower plastic member 10 can also be reduced, and thus the injection speed of the electrolyte can be accelerated.

The second lower plastic member 20 is stacked on the back face 412 of the upper cover 40, one end of the second lower plastic member 20 abuts against one end of the first lower plastic member 10, and the length direction of the second lower plastic member 20 and the length direction of the first lower plastic member 10 are the same as the length direction of the upper cover 40. Specifically, the second upper surface 211 of the second lower plastic member 20 faces and is attached to the back face 412 of the upper cover 40, and the second snapped protrusion 22 is inserted into the second mounting recess 418. The second snapped protrusion 22 can be snapped into the second mounting recess 418 to achieve mutual positioning. In the thickness direction (i.e., Z-axis direction) of the upper cover 40, the second terminal-post through-hole 27 of the second lower plastic member 20 faces and is in communication with the negative-post through hole 43 of the upper cover 40. The second gas hole 25 of the second lower plastic member 20 faces the through hole of the upper cover 40 and the second flipping sheet 46. The second grid 23 and the third grid 24 of the second lower plastic member 20 face part of the explosion-proof valve 44 of the upper cover 40.

In this case, the first grid 13 of the first lower plastic member 10 abuts against the third grid 24, and in the length direction (i.e., X-axis direction) of the upper cover 40, the second grid 23, the third grid 24, and the first grid 13 are arranged in sequence. In the length direction (i.e., X-axis direction) of the upper cover 40, the sum of the length of the second grid 23, the length of the third grid 24, and the length of the first grid 13 is greater than or equal to the length of the explosion-proof valve 44 of the upper cover 40. In the width direction (i.e., Y-axis direction) of the upper cover 40, each of the width of the second grid 23, the width of the third grid 24, and the width of the first grid 13 is greater than or equal to the width of the explosion-proof valve 44 of the upper cover 40, ensuring that the second grid 23, the third grid 24, and the first grid 13 can cooperate to completely cover the explosion-proof valve 44, which can maximize a space for air gathering below the explosion-proof valve 44, and improve an uniformity of force applied to the explosion-proof valve 44.

A tab or a blue film is prone to break to generate fragments during transportation and use of the energy storage apparatus 1000. The first grid 13, the second grid 23, and the third grid 24 are respectively disposed in the first through groove 113, the second through groove 213, and the third through groove 214, flowing of the fragments of the tab or the blue film to a position under the explosion-proof valve 44, which may block a gas channel and consequently cause an explosion-proof failure, can be prevented. In addition, floating of the tab to the explosion-proof valve 44, which may cause electrical connection between the electrode and the upper cover 40, and result in a short circuit and consequently failure of the energy storage apparatus 1000, can be prevented. The first protective grid 16 and the second protective grid 26 are respectively disposed at the first gas hole 15 and the second gas hole 25, flowing of the fragments of the tab or the blue film to a position under the first flipping sheet 45 and the second flipping sheet 46, which may block the gas channel, can be prevented, and furthermore, functions of the first flipping sheet 45 and the second flipping sheet 46 can be ensured, that is, when being subjected to the gas pressure inside the energy storage apparatus 1000, the first flipping sheet 45 and the second flipping sheet 46 can deform to short-circuit the electrodes of the electrode assembly 200 to the upper cover 40, so that the energy storage apparatus 1000 can be short-circuited, thereby protecting the energy storage apparatus 1000.

Referring again to FIG. 11, a thickness of the second lower plastic member 20 at a position where the third through groove 214 is defined is greater than a thickness of the second lower plastic member 20 at other positions. Specifically, a protrusion 29 is disposed on the second lower surface 212 of the second-lower-plastic-member body 21. In the thickness direction (i.e., Z-axis direction) of the second lower plastic member 20, the third through groove 214 extends through the second upper surface 211 and the protrusion 29. The third grid 24 is disposed in the third through groove 214, and a thickness of the third grid 24 is greater than a thickness of the second-lower-plastic-member body 21.

It can be understood that the first lower plastic member 10 includes the first grid 13, and the first grid 13 defines the first gaps extending through the first upper surface 111 and the first lower surface 112. The second lower plastic member 20 includes the second grid 23, the third grid 24 close to the second grid 23, and the protrusion 29 protruding from the second lower surface 212. The second grid 23 defines the second gaps extending through the second upper surface 211 and the second lower surface 212. The third grid 24 has the gas-hole 215 extending through the second upper surface 211 and the protrusion 29.

The end of each of the multiple first ribs 132 of the first grid 13 fixed to the second side wall 1132 is inclined towards the first lower surface 112. The end of each of the multiple second ribs 232 of the second grid 23 fixed to the fourth side wall 2132 is inclined towards the second lower surface 212. The third grid 24 extends through the second upper surface 211 and the protrusion 29, and has a relatively large thickness. That is, in the length direction (i.e., X-axis direction) of the first lower plastic member 10, the multiple first ribs 132 are inclined towards the first lower surface 112, and in the length direction (i.e., X-axis direction) of the second lower plastic member 20, the multiple second ribs 232 are inclined towards the second lower surface 212. When the first lower plastic member 10 abuts against the second lower plastic member 20, an inclined end of each of the multiple first ribs 132 and an inclined end of each of the multiple second ribs 232 are all away from the third grid 24. Therefore, the first grid 13, the second grid 23, and the third grid 24 form, as a whole, an arched grid A away from the explosion-proof valve 44 of the upper cover 40 and protruding downwards (away from the upper cover 40), and the explosion-proof valve 44 faces the arched grid A in the thickness direction of the upper cover 40. Therefore, a space below the explosion-proof valve 44 can be enlarged, facilitating gas gathering, and additionally, an accommodation space for the tab is enlarged, so that the fracture of the tab can be avoided. The arched grid A as a whole can also prevent the tab from blocking the through groove from three directions, and the three directions are respectively perpendicular to the first grid 13, the second grid 23, and the third grid 24. In addition, the arched grid A can prevent the tab from reaching below the upper cover 40 and establishing abnormal electrical connection with the upper cover 40, thereby improving the reliability.

The above implementations of the disclosure are described in detail. Principles and implementations of the disclosure are elaborated with specific examples herein. The illustration of implementations above is only used to help understanding of methods and core ideas of the disclosure. Additionally, for those skilled people in the art, according to ideas of the disclosure, there may be modifications in specific implementations and application scope. In conclusion, the content of this specification should not be construed as limiting the disclosure.

What is claimed is:

1. A lower plastic assembly configured to be assembled with an upper cover and comprising a first lower plastic member, wherein:
    the first lower plastic member comprises a first-lower-plastic-member body, wherein the first-lower-plastic-member body further comprises a first upper surface and a first lower surface, and the first upper surface is opposite to the first lower surface;
    the first-lower-plastic-member body defines a first liquid-injection through-hole, wherein the first liquid-injection through-hole extends through the first-lower-plastic-member body and is located at one end of the first-lower-plastic-member body, a cutout is defined at one side of the first liquid-injection through-hole and is in direct communication with the first liquid-injection through-hole, and the cutout extends through the first upper surface and the first lower surface; and
    the first lower plastic member further comprises a recess, wherein the recess is recessed from the first upper surface and has a lower wall and a peripheral wall surrounding the lower wall, and the first liquid-injection through-hole extends through the lower wall; the cutout extends through the first upper surface and the first lower surface in a direction from the first upper surface to the first lower surface and extends through part of a wall surface of the peripheral wall; the first lower plastic member comprises a first grid, wherein the first grid comprises a connecting portion and defines a plurality of first gaps at one side of the connecting portion, the connecting portion comprises a guiding slope inclined towards the plurality of first gaps, the cutout is located between the connecting portion and the first liquid-injection through-hole, and the cutout extends through part of the guiding slope.

2. The lower plastic assembly according to claim 1, wherein the cutout is rectangular, and a ratio of a length d of the cutout to a width H of the first-lower-plastic-member body ranges from 0.15 to 0.4.

3. The lower plastic assembly according to claim 1, wherein a ratio of an area of the cutout to an area of the first liquid-injection through-hole ranges from 0.65 to 1.35.

4. The lower plastic assembly according to claim 1, wherein a wall surface of the peripheral wall is inclined from the first upper surface towards the first liquid-injection through-hole, and the wall surface of the peripheral wall and the first upper surface defines an obtuse angle.

5. The lower plastic assembly according to claim 1, wherein:
    the first lower plastic member comprises the first grid, wherein the first grid comprises the connecting portion and defines the plurality of first gaps at the one side of the connecting portion, the plurality of first gaps extend through the first upper surface and the first lower surface, and the connecting portion comprises the guiding slope inclined towards the plurality of first gaps; and
    the cutout comprises a first part and a second part in communication with the first part, wherein the first part extends through part of the peripheral wall, and the second part extends through part of the guiding slope.

6. The lower plastic assembly according to claim 5, wherein:
the first grid comprises a plurality of first ribs connected to the connecting portion, wherein the plurality of first ribs are arranged at intervals, each two adjacent first grids define one of the plurality of first gaps, and the plurality of first ribs are located at one end of the first lower plastic member and close to the first liquid-injection through-hole; and
the plurality of first ribs are inclined in a direction from the first upper surface to the first lower surface, one side of each of the plurality of first ribs away from the first liquid-injection through-hole is inclined towards the first lower surface, and each of the plurality of first ribs and the first upper surface define an obtuse angle.

7. The lower plastic assembly according to claim 6, wherein:
the lower plastic assembly further comprises a second lower plastic member, wherein the second lower plastic member comprises a second-lower-plastic-member body, a second grid, and a third grid, wherein the second-lower-plastic-member body comprises a second upper surface and a second lower surface opposite the first upper surface, the third grid is located at one end of the second-lower-plastic-member body, and the second grid is close to the third grid; the second grid defines a plurality of second gaps extending through the second-lower-plastic-member body in a thickness direction of the second-lower-plastic-member body, and the third grid defines a plurality of gas-holes extending through the second-lower-plastic-member body in the thickness direction of the second-lower-plastic-member body.

8. The lower plastic assembly according to claim 7, wherein:
the second grid comprises a plurality of second ribs, wherein the plurality of second gaps comprise a gap defined between each two adjacent second ribs and gaps defined between the plurality of second ribs and the second-lower-plastic-member body, and each of the plurality of second ribs extends in a length direction of the second-lower-plastic-member body; and
the plurality of second ribs are inclined in a direction from the second upper surface to the second lower surface, one side of each of the plurality of second ribs away from a middle part of the second-lower-plastic-member body is inclined towards the second lower surface, and each of the plurality of second ribs and the second upper surface define an obtuse angle.

9. The lower plastic assembly according to claim 8, wherein the third grid has a thickness greater than a thickness of the second-lower-plastic-member body.

10. The lower plastic assembly according to claim 1, wherein the first lower plastic member further comprises a first gas hole and a first protective grid, wherein the first gas hole extends through the first upper surface and the first lower surface, the first protective grid is located at one side of the first lower surface in a thickness direction of the first lower plastic member and covers the first gas hole, and the first protective grid defines an exhaust region in communication with the first gas hole.

11. The lower plastic assembly according to claim 1, wherein:
the lower plastic assembly comprises a second lower plastic member, wherein the second lower plastic member comprises a second-lower-plastic-member body, a second gas hole, and a second protective grid, wherein the second-lower-plastic-member body comprises a second upper surface and a second lower surface; the second gas hole extends through the second upper surface and the second lower surface, the second protective grid is located at one side of the second lower surface in a thickness direction of the second lower plastic member and covers the second gas hole, and the second protective grid has an exhaust region in communication with the second gas hole.

12. The lower plastic assembly according to claim 1, wherein a wall surface of the peripheral wall and the first upper surface define an included angle ranging from 95° to 160°.

13. The lower plastic assembly according to claim 1, wherein the recess has a depth s ranging from 0.8 mm to 6 mm in a thickness direction of the first-lower-plastic-member body, and a distance L1 from one side of the cutout away from the recess to a center of the recess ranges from 2.8 mm to 8.4 mm in a length direction of the first-lower-plastic-member body.

14. The lower plastic assembly according to claim 1, wherein:
the lower plastic assembly further comprises a second lower plastic member, wherein the second lower plastic member comprises a second-lower-plastic-member body, the upper cover comprises an explosion-proof valve, the first lower plastic member comprises the first grid, and the first grid defines the plurality of first gaps extending through the first-lower-plastic-member body; the second lower plastic member comprises a second grid and a third grid adjacent to the second grid, wherein the second grid defines a plurality of second gaps extending through the second lower plastic member; and the third grid defines a plurality of gas-holes extending through the second lower plastic member, the second grid, the third grid, and the first grid are arranged in sequence and cooperate to form an arched grid, wherein the explosion-proof valve is opposite to the arched grid in a thickness direction of the upper cover, and the arched grid is arched in a direction away from the explosion-proof valve.

15. The lower plastic assembly according to claim 14, wherein:
in a length direction of the upper cover, a sum of a length of the second grid, a length of the third grid, and a length of the first grid is greater than or equal to a length of the explosion-proof valve of the upper cover; and
in a width direction of the upper cover, each of a width of the second grid, a width of the third grid, and a width of the first grid is greater than or equal to a width of the explosion-proof valve of the upper cover.

16. An energy storage apparatus, comprising an electrode assembly and a lower plastic assembly that is configured to be assembled with an upper cover and comprises a first lower plastic member, wherein:
the first lower plastic member comprises a first-lower-plastic-member body, wherein the first-lower-plastic-member body further comprises a first upper surface and a first lower surface, and the first upper surface is opposite to the first lower surface;
the first-lower-plastic-member body defines a first liquid-injection through-hole, wherein the first liquid-injection through-hole extends through the first-lower-plastic-member body and is located at one end of the first-lower-plastic-member body, a cutout is defined at one side of the first liquid-injection through-hole and is in direct communication with the first liquid-injection through-hole, and the cutout extends through the first upper surface and the first lower surface;

the first lower plastic member further comprises a recess, wherein the recess is recessed from the first upper surface and has a lower wall and a peripheral wall surrounding the lower wall, and the first liquid-injection through-hole extends through the lower wall; the cutout extends through the first upper surface and the first lower surface in a direction from the first upper surface to the first lower surface and extends through part of a wall surface of the peripheral wall; the first lower plastic member comprises a first grid, wherein the first grid comprises a connecting portion and defines a plurality of first gaps at one side of the connecting portion, the connecting portion comprises a guiding slope inclined towards the plurality of first gaps, the cutout is located between the connecting portion and the first liquid-injection through-hole, and the cutout extends through part of the guiding slope; and the lower plastic assembly is mounted at one end of the electrode assembly where a tab is disposed, and the lower plastic assembly faces the electrode assembly.

17. The energy storage apparatus according to claim 16, wherein the cutout is rectangular, and a ratio of a length d of the cutout to a width H of the first-lower-plastic-member body ranges from 0.15 to 0.4.

18. The energy storage apparatus according to claim 16, wherein a ratio of an area of the cutout to an area of the first liquid-injection through-hole ranges from 0.65 to 1.35.

19. The energy storage apparatus according to claim 16, wherein a wall surface of the peripheral wall is inclined from the first upper surface towards the first liquid-injection through-hole, and the wall surface of the peripheral wall and the first upper surface defines an obtuse angle.

20. The energy storage apparatus according to claim 16, wherein:

the first lower plastic member comprises the first grid, wherein the first grid comprises the connecting portion and defines the plurality of first gaps at the one side of the connecting portion, the plurality of first gaps extend through the first upper surface and the first lower surface, and the connecting portion comprises the guiding slope inclined towards the plurality of first gaps; and the cutout comprises a first part and a second part in communication with the first part, wherein the first part extends through part of the peripheral wall, and the second part extends through part of the guiding slope.

* * * * *